US007401880B1

(12) United States Patent
Walton

(10) Patent No.: US 7,401,880 B1
(45) Date of Patent: Jul. 22, 2008

(54) COMBINATION OF A/D INPUTS WITH QUADRATURE DETECTION TO GIVE HIGHER RESOLUTION POSITIONING

(75) Inventor: Derek T. Walton, Bolton, MA (US)

(73) Assignee: Sigmatel, Inc., Austin, TX (US)

( * ) Notice: Subject to any disclaimer, the term of this patent is extended or adjusted under 35 U.S.C. 154(b) by 411 days.

(21) Appl. No.: 11/032,605

(22) Filed: Jan. 10, 2005

Related U.S. Application Data

(60) Provisional application No. 60/535,400, filed on Jan. 9, 2004.

(51) Int. Cl.
*B41J 29/38* (2006.01)
*B41J 29/393* (2006.01)
*B41J 13/00* (2006.01)
*B41J 11/00* (2006.01)
*B25J 9/10* (2006.01)

(52) U.S. Cl. .......................... 347/16; 347/19; 400/578; 400/582; 318/568.17

(58) Field of Classification Search .................. 347/16, 347/19, 101, 104; 318/568.17, 568.16, 560, 318/592; 358/296, 473; 400/88, 709, 120.01, 400/613, 613.1, 582, 578, 708, 708.1
See application file for complete search history.

(56) References Cited

U.S. PATENT DOCUMENTS 4,924,165 A * 5/1990 Kohno ........................ 318/592
5,828,387 A * 10/1998 Wataya et al. ................. 347/14
6,525,837 B1 * 2/2003 Adkins et al. ................ 358/1.5
6,747,429 B2 * 6/2004 Igarashi ...................... 318/560

* cited by examiner

*Primary Examiner*—Stephen D. Meier
*Assistant Examiner*—Rene Garcia, Jr.
(74) *Attorney, Agent, or Firm*—Toler Law Group

(57) ABSTRACT

A system and method of determining paper system position and velocity are provided. The method includes receiving a first data triplet at a first time. The first data triplet includes data related to a first coarse digital position, a first channel X analog voltage and a first channel Y analog voltage. The method also includes storing the first time and the first data triplet. The method further includes receiving a second data triplet at a second time. The second data triplet includes data related to a second digital position, a second X analog voltage and a second Y analog voltage. The method also includes evaluating a control loop associated with controlling paper position and velocity. Evaluating the control loop includes determining a velocity of the paper based on the first data triplet, the second data triplet, the first time and the second time.

18 Claims, 2 Drawing Sheets

COMBINATION OF A/D INPUTS WITH QUADRATURE DETECTION TO GIVE HIGHER RESOLUTION POSITIONING

REFERENCE TO PENDING PRIOR PATENT APPLICATION

This patent application claims benefit of pending prior U.S. Provisional Patent Application Ser. No. 60/535,400, filed Jan. 9, 2004 by Derek T. Walton for COMBINATION OF A/D INPUTS WITH QUADRATURE DETECTION TO GIVE HIGHER RESOLUTION POSITIONING.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application-Specific Integrated Circuit) such as those produced by Oasis Semiconductor, Inc. of Waltham, Mass.

BACKGROUND

Ink jet print mechanisms often use DC motor servo systems to control the print path paper feed system. In such systems, an optical sensor is typically used to provide the DC servo control system with the means to track the position and velocity of the paper feed system. The sensor typically delivers 2 quadrature encoded signals. From these signals, a quadrature decoder circuit implemented within the DC servo controller can track position and velocity of the paper feed system.

PRIOR ART

Digital-Only Quadrature Systems

The simplest quadrature system is a system in which each of the two quadrature signals can take on either a value of 0 or 1. As the paper system advances, each quadrature signal will transition from 0 to 1 to 0, etc. at fixed intervals of motion. The optical sensor is arranged such that the two outputs are roughly 90 degrees out of phase. Thus, for motion in a particular direction, the pair of quadrature signals would follow a sequence such as 00, 01, 11, 10, 00, etc. For motion in the opposite direction, the reverse sequence would result. The quadrature decoder in the DC servo controller monitors the sequence of transitions in order to detect motion and direction of motion.

See FIG. 1.

In a digital-only quadrature system, the resolution with which the paper system can position paper will depend on the paper feed distance associated with one step along the quadrature sequence. For instance, if each quadrature step (00 to 01, 01 to 11, etc.) represents 1/2400th inch of paper motion, then it is reasonable to expect that paper position will only be known to roughly 1/2400th inch. (In such a system, one would expect the average paper position error to be 1/4800th inch, and the worst case position error to approach 1/2400th inch).

Obviously, it is possible to increase the resolution of a digital-only quadrature system by decreasing the paper feed distance associated with each step in the quadrature sequence. However, this approach can increase the cost of the system, by requiring a larger diameter optical encoder wheel, or a higher resolution encoder grating, or both.

Analog-Only Quadrature Systems

Another method to increase the resolution of the quadrature system is to construct the encoder output to provide a sinusoidal or "rounded-triangle" waveform rather than a square wave. With such an encoder system and an analog-capable quadrature decoder, it is possible to obtain "sub-quadrature interval" position information.

See FIG. 2.

An analog-capable quadrature decoder typically consists on a two-channel ADC which periodically samples the incoming quadrature signals. The first step in processing each sample pair may be to classify the pair in terms of the more standard four phases associated with the digital-only quadrature system. One possible classification technique is to use "cross-over" points to define the boundaries of each of the 4 phases. Once this classification is performed, it is possible to track coarse position in much the same way as with a digital-only quadrature system.

Once the coarse position is determined, higher resolution position can be obtained by inspecting the appropriate encoder signal. For instance, within phase 00, fractional position could be calculated by assuming that the encoder waveform X increases linearly. The fractional position could thus be calculated to be (channelXVoltage−lowerCrossOver)/(upperCrossOver−lowerCrossOver)

Hybrid Analog/Digital Quadrature Systems

With an analog-only quadrature system, it is necessary to sample the incoming quadrature signals at a rate high enough to ensure that accurate motion tracking is obtained. Specifically, the sampling must occur at or above the Nyquist rate associated with the fastest the paper system might move.

In some cases, it may become prohibitively expensive to employ an ADC system fast enough to guarantee sampling above the Nyquist rate. To address such conditions, prior art may employ a hybrid digital/analog decoder system. In such a system, the motion tracking system receives both digital and analog versions of the quadrature signals. The digital versions of the quadrature signals are used to track coarse position. The digital-only coarse position can use a high sample rate in order to maintain position coherency during high speed moves. When the paper system is moving more slowly, as when the end of a move is reached, the coarse digital position is supplemented with the analog information to achieve an aggregate high resolution position.

Hybrid Analog/Digital Quadrature Systems within Servo Control Loops

A typical DC motor servo control loop built around a quadrature position sensing systems needs to obtain both position and velocity information from the sensing system. In general, the control loop algorithm is evaluated at periodic, fixed time intervals. At each evaluation, the control loop uses the sensed position and velocity to calculate the motor control parameters (for instance, the motor drive duty cycle) for the next interval.

In addition to providing position and velocity to be used in the control loop evaluation, some control schemes require that the quadrature sensing system provide very accurate "end of move" positioning. This "end of move" positioning is used to generate an interrupt to the move controller when the paper system position reaches a position close to or matching the "end of move" position.

To address these requirements, current combined analog/digital quadrature sensing systems use dedicated logic which both (1) tracks the coarse, digital like position, and (2) maintains an aggregate fine position based on analog sampling of the quadrature signals. This logic continually generates an aggregate (coarse+fine) paper system position. The resultant high resolution paper position is accessible by the control loop firmware via a control/state register read. The high resolution paper position is also used to generate an interrupt when a specified paper position is reached.

A major disadvantage of this prior art implementation is that dedicated hardware resources must be allocated to continuously perform the calculations which recover aggregate high resolution position from the coarse, digital-like position and the analog samples. In many cases, the required calculations can be quite complex. Some of the challenges include: allowing for variation in the amplitudes of the quadrature signal sinusoids, calibration of the cross-over points, robustness in the presence of ADC sampling noise, etc.

THE INVENTION

Figure 1:
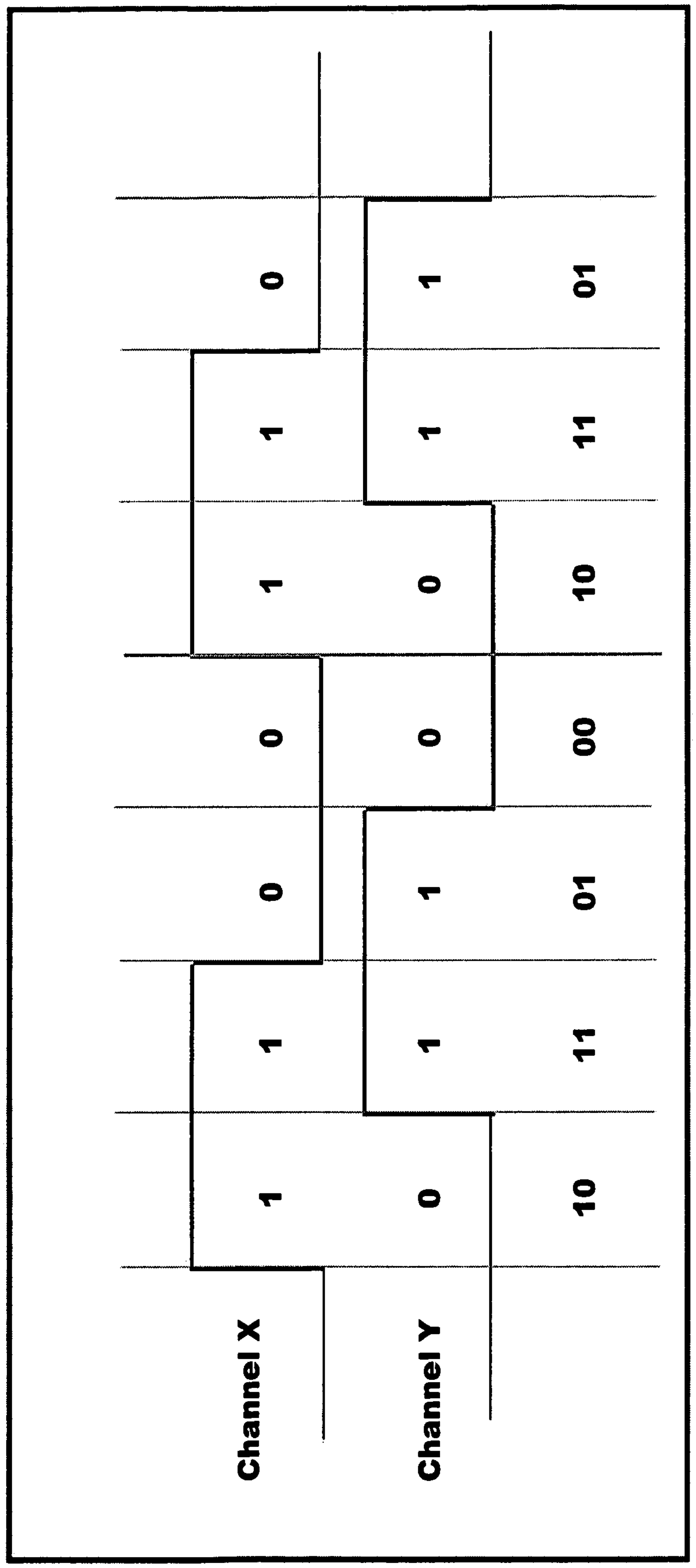
FIG. 1 illustrates quadrature signals having a square waveform.
Figure 2:
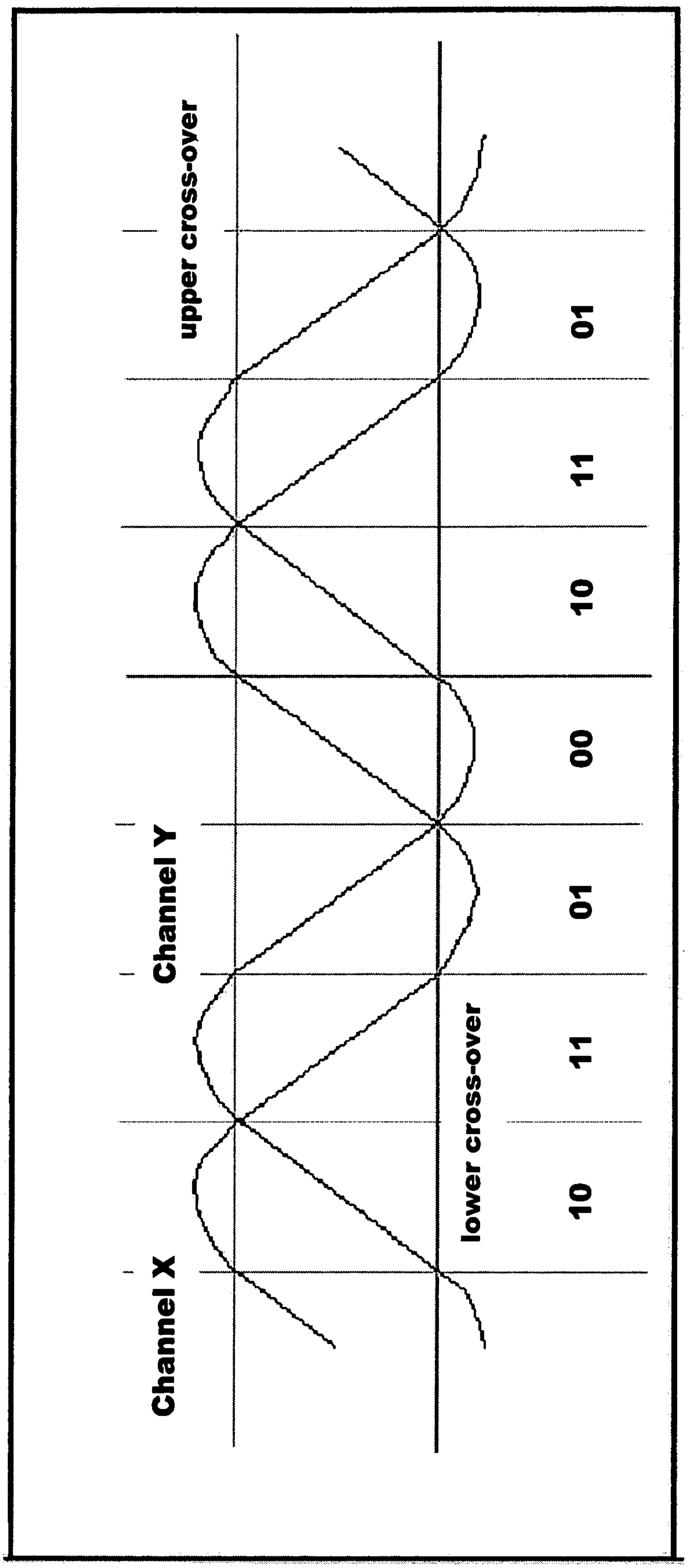
FIG. 2 illustrates quadrature signals having a sinusoidal waveform.

The invention taught herein is based on a re-partitioning of the aggregate high resolution positioning task to significantly simplify the requirements of the dedicated hardware. The fundamental approach is to perform the complex calculations which map coarse digital position and analog samples to aggregate high resolution position in firmware, as part of the DC servo control loop calculations.

As described above, there are typically two sensing requirements which must be addressed to support paper position control loop algorithms: (1) delivery of current position and velocity as inputs to the periodic control loop evaluation, and (2) interrupt generation when a specific "end of move" position is reached.

Determination of Current Position and Velocity

A traditional digital-only quadrature decoder and motion tracker is used to continuously maintain a coarse, digital-only position. In addition, a mechanism is implemented which samples the resultant coarse digital position AND the two analog quadrature signals at the same time (or as close to possible as the same time if a single ADC is used with an input which multiplexes between the two analog quadrature signals). At each sample time, a triplet of values is recorded: digital position, channel X analog voltage, and channel Y analog voltage.

The sampled triplets are placed in a buffer. Each time the firmware performs its periodic control loop evaluation, it calculates paper system position and velocity based on the sample triplets in the buffer. The position calculation is performed in very much the same way that the prior art hardware would have performed the calculation. But of course the firmware position calculation is only performed on an as needed basis during the control loop evaluation (rather than continually). The firmware can calculate velocity from two (or more) different sampled triplets by first calculating the position associated with each triplet and then considering the sample time difference between the triplets.

End of Move Position Interrupt

The "end of move" position interrupt is typically configured to occur when the paper position reaches a position which falls within a previously established narrow position range. For instance, an interrupt may be desired when the following is TRUE: (positionLowerBound<=position<positionUpperBound). In the prior art implementation, the position is continually calculated by the hardware, such that this comparison and thus interrupt can be evaluated directly.

As part of the invention, we recognize that it is possible to transform the position comparison (positionLowerBound<=position<positionUpperBound) into a series of comparisons of the coarse digital position and the analog voltages. For instance, for the typical case of a "narrow" range of stop position (where "narrow" is taken to be less than ½ of a digital position increment), we can perform the following transformation:

(positionLowerBound<=position<positionUpperBound)

becomes ((coarseDigitalPositionLowerBound<=coarseDigitalPosition<coarseDigitalPosition*U* (analogChannel*X*LowerBound<=analogChannel*X*<analogChannel*X*UpperBound) && (analogChannel*Y*owerBound<=analogChannel*Y*<analogChannel*Y*UpperBound)).

With this transformation, the hardware needs only perform a set of simple comparisons to create the "end of move" position interrupt. It is the job of the firmware to establish the lower and upper bounds of coarse digital position and the analog voltages associated with its desired end of move position.

Wider position interrupt ranges can be easily accommodated by more complicated constructions of the same basic comparisons of coarse digital positions and analog voltages.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A machine-readable storage medium including instructions to determine paper system position and velocity, the instructions when executed by the machine causing the machine to:

receive, at a first time, a first data triplet including data related to a first digital position, a first channel X analog voltage and a first channel Y analog voltage;

store the first time and the first data triplet;

receive, at a second time, a second data triplet including data related to a second digital position, a second X analog voltage and a second Y analog voltage; and evaluate a control loop associated with controlling paper position and velocity, wherein evaluating the control loop includes determining a velocity of the paper based on the first data triplet, the second data triplet, the first time and the second time.

2. The machine-readable storage medium of claim 1, further comprising instructions causing the machine to sample continuously maintained digital position data at the first time to receive the first digital position and sample the continuously maintained digital position data at the second time to receive the second digital position.

3. The machine-readable storage medium of claim 1, further comprising instructions causing the machine to maintain the first digital position data and the second digital position data continuously and sample channel X analog voltage and channel Y analog voltage during evaluation of the control loop.

4. The machine-readable storage medium of claim 1, further comprising instructions causing the machine to:

determine an end of move position, wherein the end of move position includes an upper digital position, an upper channel X analog voltage, an upper channel Y analog voltage, a lower digital position, a lower channel X analog voltage and a lower Y channel voltage; and compare the paper position to the end of move position.

5. The machine-readable storage medium of claim 1, wherein the first channel X analog voltage and the first channel Y analog voltage are received from an optical sensor.

6. The machine-readable storage medium of claim 1, wherein the control loop is associated with a DC motor servo system.

7. A system to determine paper system position and velocity, the system comprising:

logic; and a memory accessible to the logic, wherein the memory includes instructions executable by the logic to:

receive, at a first time, a first data triplet including data related to a first coarse digital position, a first channel X analog voltage and a first channel Y analog voltage;

receive, at a second time, a second data triplet including data related to a second digital position, a second X analog voltage and a second Y analog voltage; and evaluate a control loop associated with controlling paper position and velocity, wherein evaluating the control loop includes determining a velocity of the paper based on the first data triplet, the second data triplet, the first time and the second time.

8. The system of claim 7, wherein the control loop controls a paper feed system of an office automation product.

9. The system of claim 7, wherein the first data triplet is stored in the memory.

10. The system of claim 7, further comprising an optical sensor to sense position information, and to output digital position, X analog voltage and Y analog voltage.

11. The system of claim 7, further comprising hardware to generate an end of move (EOM) interrupt.

12. The system of claim 11, wherein the EOM interrupt is generated based at least partially on the first data triplet, the second data triplet, the first time and the second time.

13. The system of claim 11, wherein the hardware is further to determine an upper bound and a lower bound associated with the EOM interrupt.

14. The system of claim 13, wherein the hardware is further to generate the EOM interrupt based on the upper bound and the lower bound associated with the EOM interrupt.

15. The system of claim 13, wherein the upper bound includes a digital position upper bound, a channel X analog voltage upper bound and a channel Y analog voltage upper bound, and wherein the lower bound includes a digital position lower bound, a channel X analog voltage lower bound and a channel Y analog voltage lower bound.

16. The system of claim 7, wherein determining the velocity includes:

determining a change in the paper position from the first data triplet and the second data triplet; and dividing the change in the paper position by a difference between the first time and the second time.

17. The system of claim 7, further comprising an application specific integrated circuit (ASIC) including the logic and the memory.

18. The system of claim 17, her comprising a multi-function peripheral (MFP) device including the ASIC.

* * * * *